United States Patent
Furlong et al.

(10) Patent No.: US 12,455,933 B2
(45) Date of Patent: Oct. 28, 2025

(54) SOCIAL MEDIA PLATFORM WITH RECOMMENDATION ENGINE REFRESH

(71) Applicants: Lemon Inc., Grand Cayman (KY); Douyin Vision Co., Ltd., Beijing (CN)

(72) Inventors: Jordan Furlong, Los Angeles, CA (US); Han Cheng, Beijing (CN); Ciaran Farley, Culver City, CA (US); Alan Yee, Culver City, CA (US); Isha Mukesh Shah, Los Angeles, CA (US); Riley Gish, Culver City, CA (US); Amanda Hanna, Culver City, CA (US); Jinyi Lu, Culver City, CA (US); Wenrong Zhang, Beijing (CN); Yiming Chen, Beijing (CN); Tsz Ling Christina Leung, Los Angeles, CA (US)

( * ) Notice: Subject to any disclaimer, the term of this patent is extended or adjusted under 35 U.S.C. 154(b) by 419 days.

(21) Appl. No.: 17/935,902

(22) Filed: Sep. 27, 2022

(65) Prior Publication Data
US 2024/0104149 A1    Mar. 28, 2024

(51) Int. Cl.
G06F 16/9535    (2019.01)
G06Q 50/00    (2024.01)

(52) U.S. Cl.
CPC ......... G06F 16/9535 (2019.01); G06Q 50/01 (2013.01)

(58) Field of Classification Search
CPC .. G06F 16/9535; G06F 16/9536; G06Q 50/01
See application file for complete search history.

(56) References Cited

U.S. PATENT DOCUMENTS

| | | | |
|---|---|---|---|
| 2010/0153516 A1* | 6/2010 | Weinberg | G06Q 30/0251 709/217 |
| 2013/0159274 A1* | 6/2013 | Silberstein | H04L 67/5682 707/706 |
| 2014/0189539 A1* | 7/2014 | St. Clair | G06Q 30/0241 715/753 |

(Continued)

OTHER PUBLICATIONS

Li, Yuchen, et al. "Context-aware advertisement recommendation for high-speed social news feeding." 2016 IEEE 32nd International Conference on Data Engineering (ICDE). IEEE, 2016. (Year: 2016).*

*Primary Examiner* — Corey Russ
(74) *Attorney, Agent, or Firm* — Alleman Hall & Tuttle LLP (57) ABSTRACT

A computing system is provided, including one or more processors configured to provide a social media platform configured to serve a content feed to a user. The processor is further configured to generate user content interaction information by detecting user interactions with the content feed and provide a recommendation engine that selects content items for display in the content feed based on the generated user content interaction information. The processor is further configured to receive a refresh request to refresh the recommendation engine and refresh the recommendation engine at least in part by masking or resetting the user content interaction information upon receiving the refresh request. After the refresh, the processor is further configured to generate, via the recommendation engine, post-refresh content items based on the masked or reset user content interaction information, and transmit the post-refresh content items to the user device for display in the content feed.

16 Claims, 8 Drawing Sheets

(56) References Cited

U.S. PATENT DOCUMENTS

| | | | | |
|---|---|---|---|---|
| 2014/0250177 | A1* | 9/2014 | Sohn | G06F 16/9535 |
| | | | | 709/204 |
| 2015/0213487 | A1* | 7/2015 | Nwosu | G06F 3/0488 |
| | | | | 705/14.45 |
| 2015/0319201 | A1* | 11/2015 | Schacht | G06N 5/022 |
| | | | | 709/204 |
| 2017/0324820 | A1* | 11/2017 | Wong | H04L 67/535 |
| 2019/0236680 | A1* | 8/2019 | Kounine | G06F 17/16 |
| 2019/0320216 | A1* | 10/2019 | Liu | G06F 16/437 |
| 2019/0394530 | A1* | 12/2019 | Kimble | H04N 21/4668 |
| 2020/0068033 | A1* | 2/2020 | Liu | G06F 16/958 |
| 2021/0350202 | A1* | 11/2021 | Zachariah | G06Q 30/02 |
| 2022/0164826 | A1* | 5/2022 | Hanes | G06N 20/00 |
| 2024/0126823 | A1* | 4/2024 | Yao | G06F 16/9535 |

* cited by examiner

SOCIAL MEDIA PLATFORM WITH RECOMMENDATION ENGINE REFRESH

BACKGROUND

With the rise of online social media platforms that allow original media to be shared with the world in a matter of seconds, users upload, consume, and engage with copious amounts of content on a daily basis. Such content includes text posts, photos, long-form videos, and short-form videos. However, with the immense amount of content available on social media platforms, it is difficult for users to find uploaded content that is suited to their taste. A recommendation system has been developed to address this matter that recommends content to be displayed in a content feed for each user. The recommendation system, which is based on an artificial intelligence (AI) model, recommends content to users based on their prior engagement with content on the social media platform, effectively curating each user's content feed on the social media platform.

SUMMARY

To address the issues discussed herein, computerized systems and methods are provided. In one aspect, a computerized system is provided that includes one or more processors configured to execute instructions stored in memory to provide a social media platform configured to serve a content feed to a user computing device of a user. The processor is further configured to generate user content interaction information by detecting user interactions with the content feed, and provide a recommendation engine that selects content items for display in the content feed based on the generated user content interaction information. The processor is further configured to receive a refresh request to refresh the recommendation engine via a graphical user interface (GUI) including a refresh selector, and refresh the recommendation engine at least in part by masking or resetting the user content interaction information in response to receiving the refresh request. After the refresh, the processor is further configured to input the masked or reset user content interaction information to the recommendation engine. The processor is further configured to generate, via the recommendation engine, post-refresh content items based on the masked or reset user content interaction information, and transmit the post-refresh content items to the user device for display in the content feed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed above, computer-based techniques have been developed to enhance users' experience on a social media platform, in which an artificial intelligence system detects and utilizes users' interactions with content to determine their tastes and preferences. The system uses this data to select content for a user, allowing the user to enjoy personalized media content selected in a personalized manner out of the multitude of media content available on the platform. However, in the circumstance that a user's interest changes, the recommendation system would be selecting content based on their previous content interactions that no longer reflect the user's tastes. As a result, the recommendation system will serve content to the user in which the user is no longer are interested. This may result in decreased user enjoyment of the social media platform.

Figure 1:
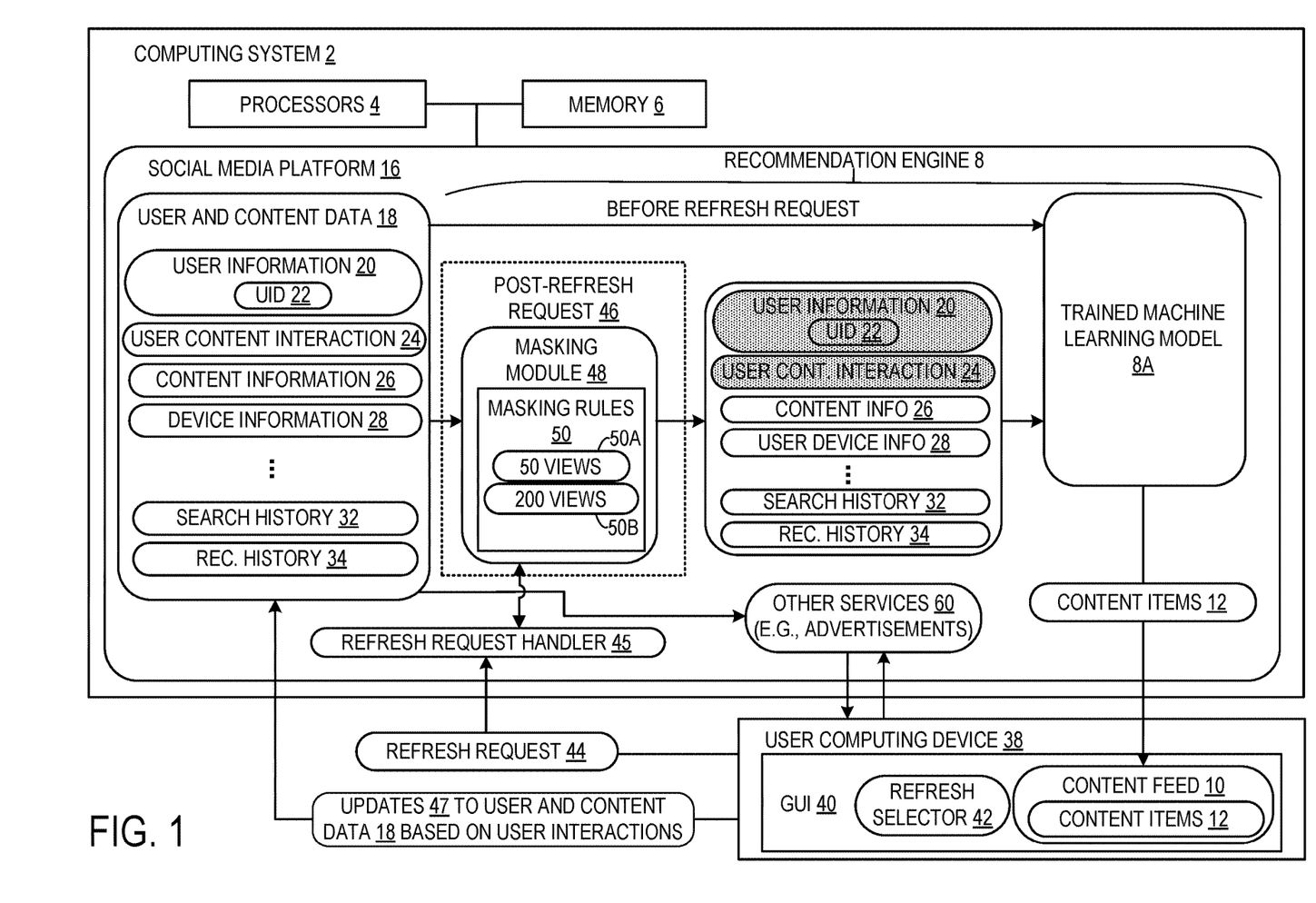
FIG. 1 shows a schematic view of a computing system including a social media platform configured to serve a content feed to a user computing device, in which content items in the content feed are selected based on user content interaction information and a recommendation engine is refreshed by masking or resetting the user content interaction information.

In view of the issues discussed above, a social media platform utilizing a recommendation engine refresh is provided. FIG. 1 shows a schematic view of a computing system 2 including a social media platform 16 configured to serve a content feed 10 to a user computing device 38 of a user, in which content items 12 in the content feed 10 are selected based on content interaction information 24 via a recommendation engine 8, and the recommendation engine 8 is refreshed by masking or resetting the user content interaction information 24. The computing system 2 may include one or more processors 4 configured to execute instructions using associated memory 6 to perform the functions and processes of the computing system 2 described herein. For example, the computing system 2 may include a cloud server platform including a plurality of server devices, and the one or more processors 4 may be one processor of a single server device or multiple processors of multiple server devices. Below, the functions of computing system 2 as executed by processor 4 are described by way of example, and this description shall be understood to include execution on one or more processors 4 distributed among one or more of the devices discussed above.

The social media platform is configured to generate a personalized content feed 10 for each user based on user and content data 18 which includes user information 20 including a user identification (ID) 22, user content interaction information 24, content information 26, device information 28, search history 32, and recommendation history information 34, and to serve the content feed 10 to the user computing device 38 of the user. The user and content data 18 is also used to personalize a user's experience with other services 60 such as advertisements. The user information 20 includes, for example, a unique user identification 22, password, user's language, country, gender, and categories of interest the user selected upon creating an account. The content information 26 includes characteristics of the content such as keywords in captions, hashtags, and audio content identification. For example, content information 26 may identify a video as relating to cars, travel, cooking, or various other topics based on keywords present in captions or based on hashtags. Further, the content information 26 may include the number of views or likes that a content item has received. In addition, the content information 26 may indicate whether the content uses a particular image or video filter, template, etc. The content information does not include information that is user-specific, but rather includes information regarding content such as videos, images, and text uploaded from users and stored on the social medial platform. The device information 28 includes information on the user's computing device 38 such as the location, device type, operating system, and time zone of the user's computing device 38. This information can be updated each as the user computing device communicates with the social media platform. The computing device 38 may be any type of a variety of computing devices, such as a smartphone, tablet computing device, head mounted display device, laptop, desktop, smartwatch, etc. The search history 32 includes keywords the user entered as search queries in a search tool of the social media platform. The recommendation history 34 includes the content items 12 previously recommended by the computing system 2, that appeared in the content feed 10.

The user content interaction information 24 is generated by detecting user interactions with the content feed 10 via the processor 4 of the system 2. The processor 4 is configured to detect the user interactions with the content items 12 in the content feed 10, log the user's interactions as user content interaction information 24, and update the information as the user watches and interacts with the content items 12, by sending data indicating updates 47 from the user computing device 38 to the computing system 2. The content items 12 may be any type of a variety of digital content types, such as a video, audio, or image. For example, the user content interaction information 24 may include other accounts that the user follows, content the user likes or shares, content the user comments on, content the user adds to their favorites, and content the user flags as "not interested".

The processor 4 is further configured to provide a recommendation engine 8 and to input the generated user content interaction information 24 to the recommendation engine 8. The recommendation engine 8 may include a trained machine learning model 8A and a masking module 48 configured to selectively mask input to the trained machine learning model 8A, based upon instructions from a refresh request handler 45. The trained machine learning model 8A may be trained to predict content items that the user is likely to interact with based upon prior user interactions with the social media platform. The recommendation engine 8, via the trained machine learning model 8A, selects the content items 12 for display in the content feed 10 based on the generated user content interaction information 24. The trained machine learning model 8A of the recommendation engine 8 may be built on a trained neural network such as a transformer model, which is a deep learning model that adopts the mechanism of self-attention, differentially weighting the significance of each part of the input data. In addition to the user content interaction information 24, the user information 20, content information 26, and device information 28 may be input to the trained machine learning model 8A of the recommendation engine 8 and used by the engine to select the content items 12 for display in the content feed 10. For instance, a user looking for a car to purchase may follow an account of a car dealer, watch videos uploaded by the car dealer featuring cars for sale, and leave comments on the videos. In this scenario, the trained machine learning model 8A of the recommendation engine 8 is likely to select the content items 12 that feature cars for sale to appear in the content feed 10 for the user. Furthermore, if the user information 20 indicates that the user resides in the United States, the trained machine learning model 8A of the recommendation engine 8 may be trained to select the content items 12 that show cars for sale in the United States.

Figure 2:
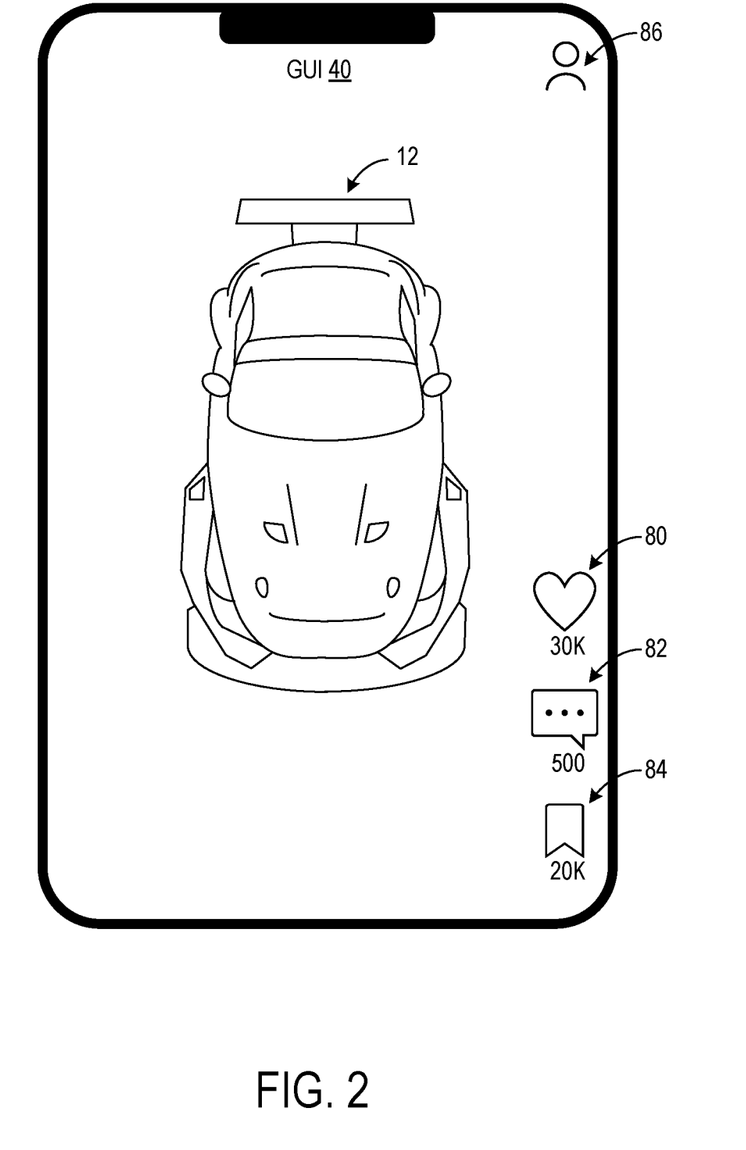
FIG. 2 shows an example graphical user interface (GUI) of a user computing device according to the system according to FIG. 1, displaying a content feed.

Turning briefly to FIG. 2, an example GUI 40 displaying the content feed 10 on the user computing device 38 is illustrated. The processor 4 is further configured to serve a graphical user interface (GUI) 40 configured to display the content feed 10, to the user computing device 38. As depicted in FIG. 2, the GUI 40 of the content feed 10 includes the content items 12, a "LIKE" icon 80, "COMMENTS" icon 82, "FAVORITES" icon 84, and settings icon 86 for the user to view and input user account settings. In the example, the content items 12 that include cars, which were selected by the trained machine learning model 8A of the recommendation engine 8, are displayed on the content feed 10. The "LIKE" icon 80 takes the form of a heart symbol, and the user may use the like button by tapping on "LIKE" icon 80 for the content items 12 the user enjoys. The "COMMENTS" icon 82 allows the user to add comments to the content items 12. The "FAVORITES" icon 84 allows the user to add the content items 12 to the user's favorites folder for easy access later on. Tapping these icons serves as interaction between the user and the content items 22, and this interaction is detected and stored as the user content interaction information 24 as discussed above. The GUI 40 also includes the settings icon 86 that allows the user to manage the user's account settings for purposes discussed herein.

Figure 3A:
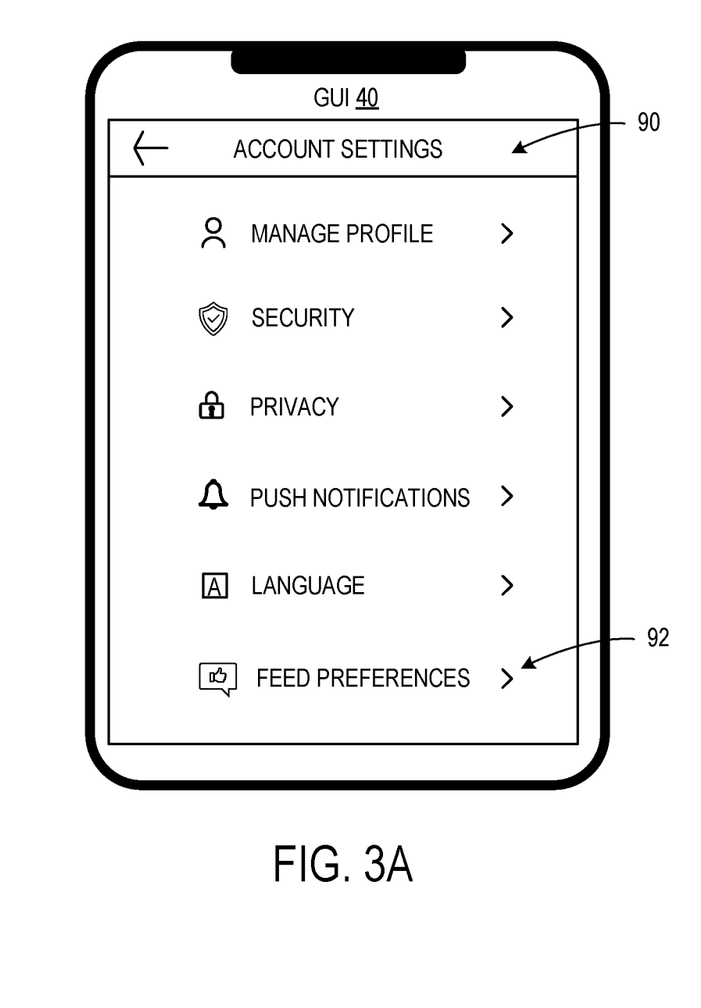
FIGS. 3A and 3B show an example GUI of the system according to FIG. 1 displaying a content feed refresh selector on the user computing device.
Figure 3B:
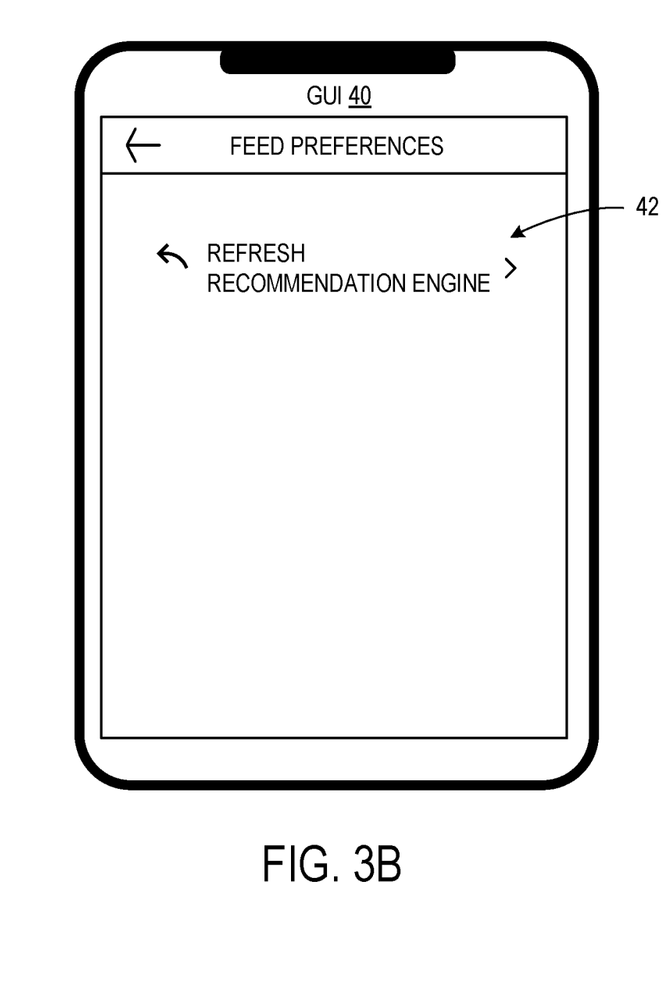

The GUI 40 further includes a refresh selector 42. Upon selection of the refresh selector 42, the user computing device 38 is configured to send a refresh request to computing system 2. A refresh request handler 45 executed by processor 4 of computing system 2 is configured to receive the refresh request 44 to refresh the recommendation engine 8 from the user computing device 38 upon user selection of the refresh selector 42. The refresh request handler 45 may be configured to communicate with the masking module 48 of the recommendation engine 8 to instruct the masking module to perform masking according to masking rules 50, to thereby implement the requested refresh operation. Turning briefly to FIGS. 3A and 3B, an example GUI 40 displaying the recommendation engine refresh selector 42 on the user computing device 38 is illustrated. When the user taps the settings icon 86 of FIG. 2, the GUI 40 displays the account settings 90 that enable the user to manage settings such as security, privacy, and content feed preferences 92, as shown in FIG. 3A. When the user selects the content feed preferences 92, the GUI 40 displays the recommendation engine refresh selector 42 that enables the user to make a refresh request to refresh the recommendation engine 8, as shown in FIG. 3B. When the refresh request is made, the GUI 40 may display text that explains the meaning of a recommendation engine refresh and the implications of activating such a recommendation engine refresh on the user's experience. The text may also prompt a user to "cancel" or "confirm" the refresh. Selecting the "confirm" option activates the recommendation engine refresh. In addition, the processor 4 may be configured to receive a request from the user to undo the recommendation engine refresh and execute the request to undo the recommendation engine refresh in response. This request can be made when the user is dissatisfied with post-refresh content items after the recommendation engine refresh.

Turning back to FIG. 1, in response to receiving the refresh request 44 as discussed above, the processor 4 is configured to refresh the recommendation engine 8 at least in part by masking or resetting the user content interaction information 24. Upon receiving the request, the processor 4 is configured to mask, via a masking module 48, a portion of the user and content data 18 including the user information 20 and user content interaction information 24 according to masking rules 50. The processor 4 is further configured to input the masked or reset user content interaction information 24 and user information 20 to the trained machine learning model 8A of the recommendation engine 8. Masking the user content interaction information 24 and user information 20 may include masking raw data of the user content interaction information 24 and user information 20 as well as masking embeddings corresponding to the user content interaction information 24 and user information 20.

Figure 4:
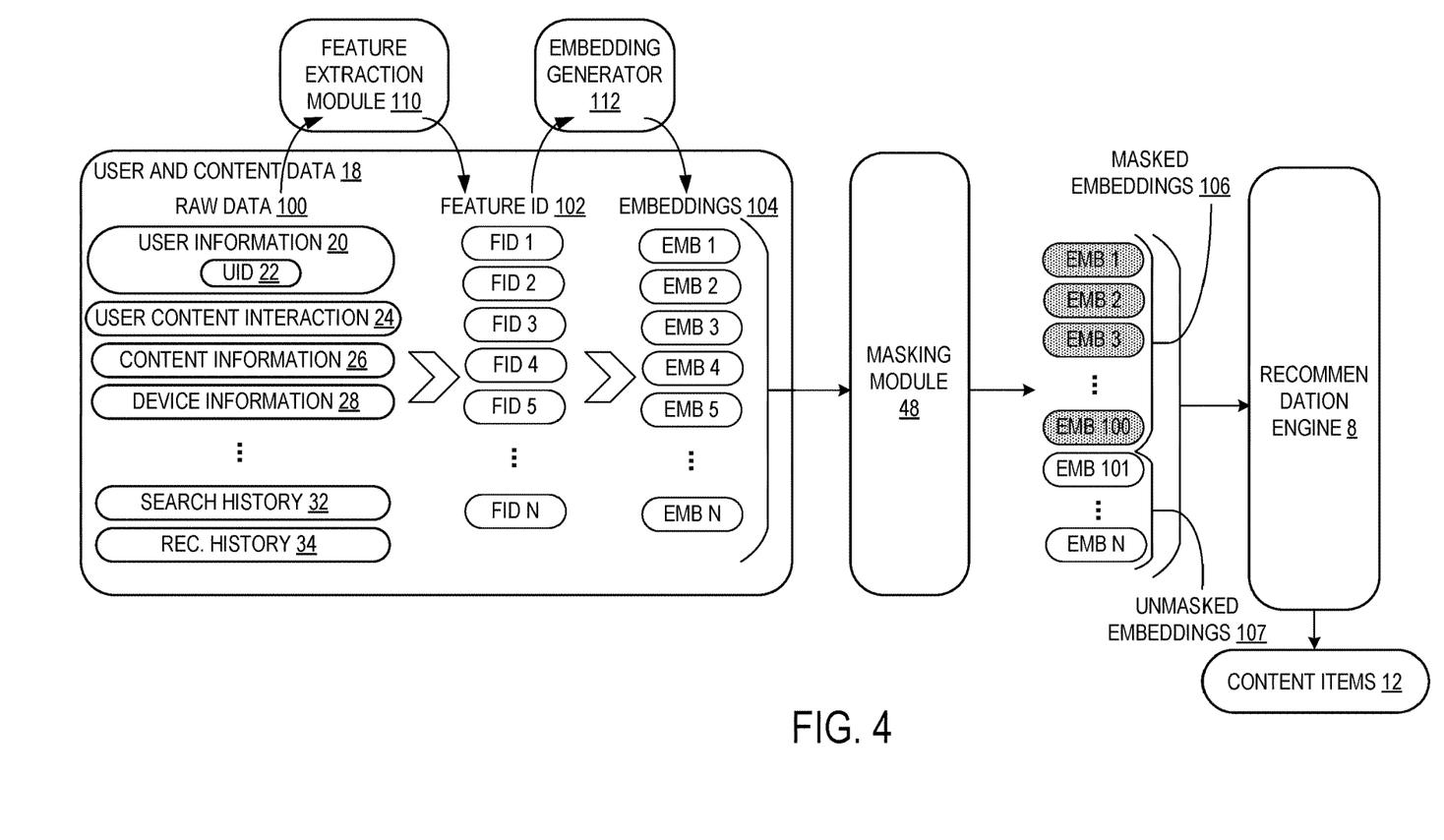
FIG. 4 shows a schematic view of example embeddings generated by an embedding generator and masked embeddings generated by a masking module of the system according to FIG. 1.

Turning briefly to FIG. 4, a schematic view of a process of generating embeddings by an embedding generator 112 and masking the generated embeddings by the masking module 48 is illustrated. Initially, feature identifications (IDs) 102 are extracted, via a feature extraction module 110, from raw data 100 of the user and content data 18 including the user content interaction information 24. Each feature ID 102 uniquely identifies a respective feature within the dataset. For example, the feature IDs 102 extracted from the user information 20 may include the United States as the user's country and English as the user's language. The feature IDs extracted from the user content interaction information 24 may include the content items the user liked and commented on. After the feature IDs 102 are extracted, embeddings 104 for the feature IDs 102 are generated via an embedding generator 112. The embeddings 104 are numerical vectors (e.g., [1, 0.5, 2.1 . . . ]) that represent the feature IDs 102. The embeddings 104 are provided to the masking module 48 to generate masked embeddings 106 for certain target information by setting the vector values to a predetermined mask value such as zero. Alternatively, the masking may be accomplished by setting the vector values to some other value that causes the masked embeddings 106 to be effectively ignored or disregarded by recommendation engine 8. In the depicted example, embedding 1 (EMB 1) to embedding 100 (EMB 100), which represent the user information 20 and user content interaction information 24, are masked. These embeddings are referred to as masked embeddings 106. Embedding 101 (EMB 101) to embedding N (EMB N), which represent other information such as content information 26 and device information 28, are unmasked. These embeddings are referred to as unmasked embeddings 107. The masked embeddings 106 are input to the trained machine learning model 8A of the recommendation engine 8 along with the unmasked embeddings 107. The masked embeddings 106 with predetermined mask values such as zero are disregarded by the trained machine learning model 8A of the recommendation engine 8 to select the content items. That is, in the depicted example, the user information 20 and user content interaction information 24 are not considered by the trained machine learning model 8A of the recommendation engine 8 when selecting the post-refresh content items 12. Furthermore, since the recommendation engine refresh merely masks a portion of the user and content data 18 such as the user information 20 and user content interaction information 24 instead of deleting all user-specific data associated with the user account, the user would be able to continue using the services of the platform without setting up a new account. By not masking device information 28, the user can continue to view content oriented toward the user's geographic location, as one example. Further, functions of the social media platform such as a search tool that offers personalized search results would function as the user is accustomed to after refreshing the recommendation engine 8, since the user search history 32 is not deleted. In addition, because the user information 20 and user content interaction information 24 is masked rather than deleted, and the search history 32 and recommendation history 34 are not deleted, sponsored content such as advertising can be targeted to users based on these data sources after the recommendation engine is refreshed, enabling more relevant sponsored content to be shown to each user than if such information were deleted.

Figure 5:
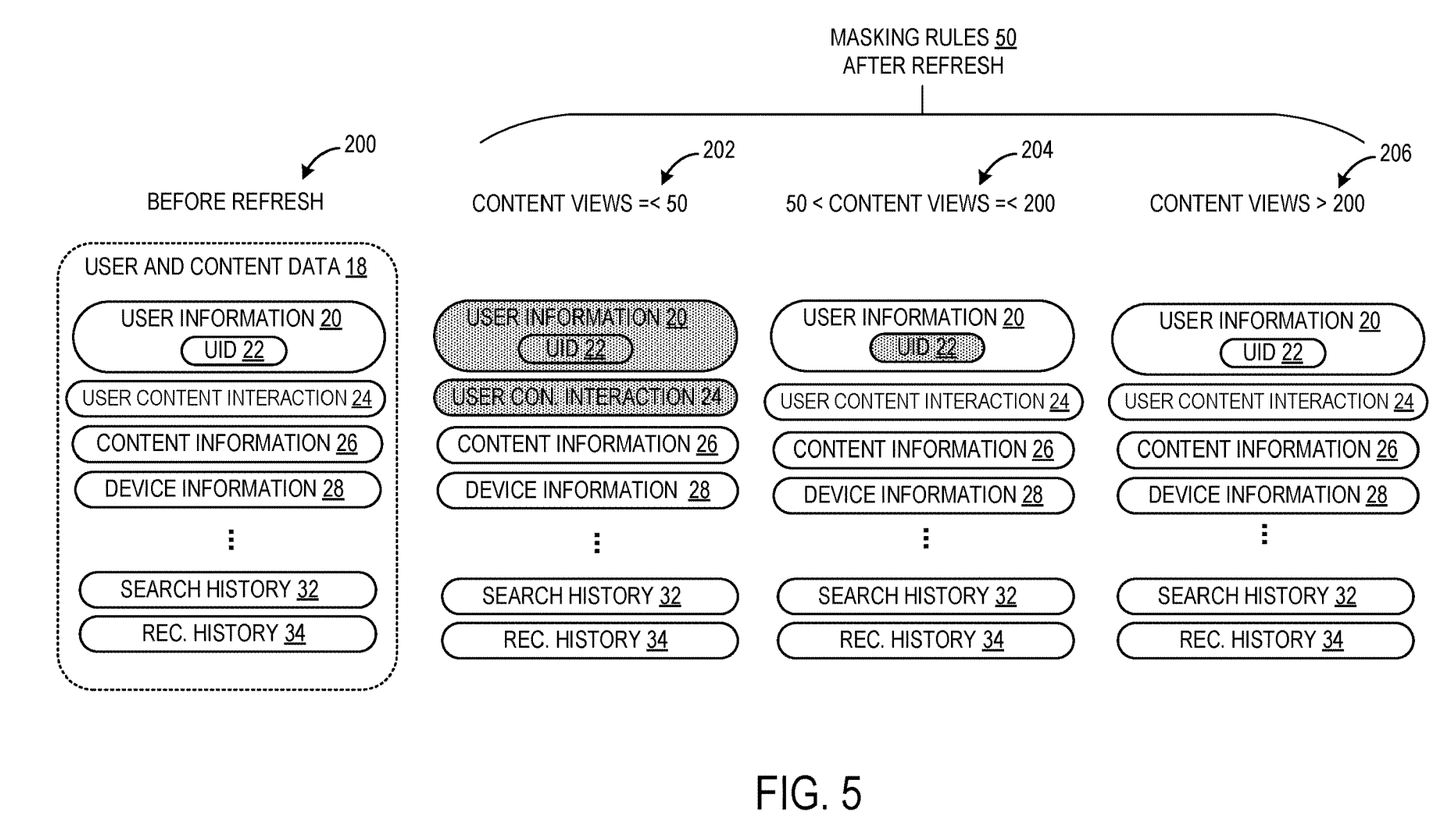
FIG. 5 shows example masking rules implemented by a masking module of the system according to FIG. 1 after a recommendation engine refresh request.

As discussed above, after the recommendation engine refresh, the user information 20 and user content interaction information 24 are masked by the masking module 48 according to the masking rules 50. FIG. 5 shows an example of the masking rules 50 implemented by the masking module 48 of the system 2 according to FIG. 1. Before the refresh request is made, no information in the user and content data 18 is masked or reset, as shown in 200. According to the masking rules 50, the refresh of the recommendation engine 8 can include a first temporary refresh that masks or resets the user content interaction information 24 and the user information 20 including the user identification 22 until a first predetermined threshold number of views 50A is reached. In the depicted example, after the refresh request is made, the user information 20 including the user identification 22 and user content interaction information 24 are masked until the first predetermined threshold number of views of the post-refresh content items 12 according to the masking rules 50, as shown in 202. The first predetermined number of views 50A may be in a range between 25 and 100 views, and in one particular embodiment is 50 views. After the first predetermined number of views have occurred, the user content interaction information 24 and user information 20, excluding the user identification 22, are unmasked, thus and only the user identification 22 continues to be masked, as shown in 204. Thus, according to the masking rules 50, the refresh of the recommendation engine can include a second temporary refresh that unmasks the user content interaction information 24 and the user information 20 except for the user identification 22 and masks the user identification 22 after the first predetermined threshold number of views 50A has occurred and until a second predetermined threshold number of views 50B is reached. The second predetermined number of views may be between 150 and 300 views, and in one particular embodiment is 200 views. The computing system 2 is further configured to end the second temporary refresh by unmasking the user identification 22 after the second predetermined threshold number of views 50B is reached. Thus, after the second predetermined number of views 50B, the user identification 22 is also unmasked, and no other information is masked either, as shown at 206.

Figure 6:
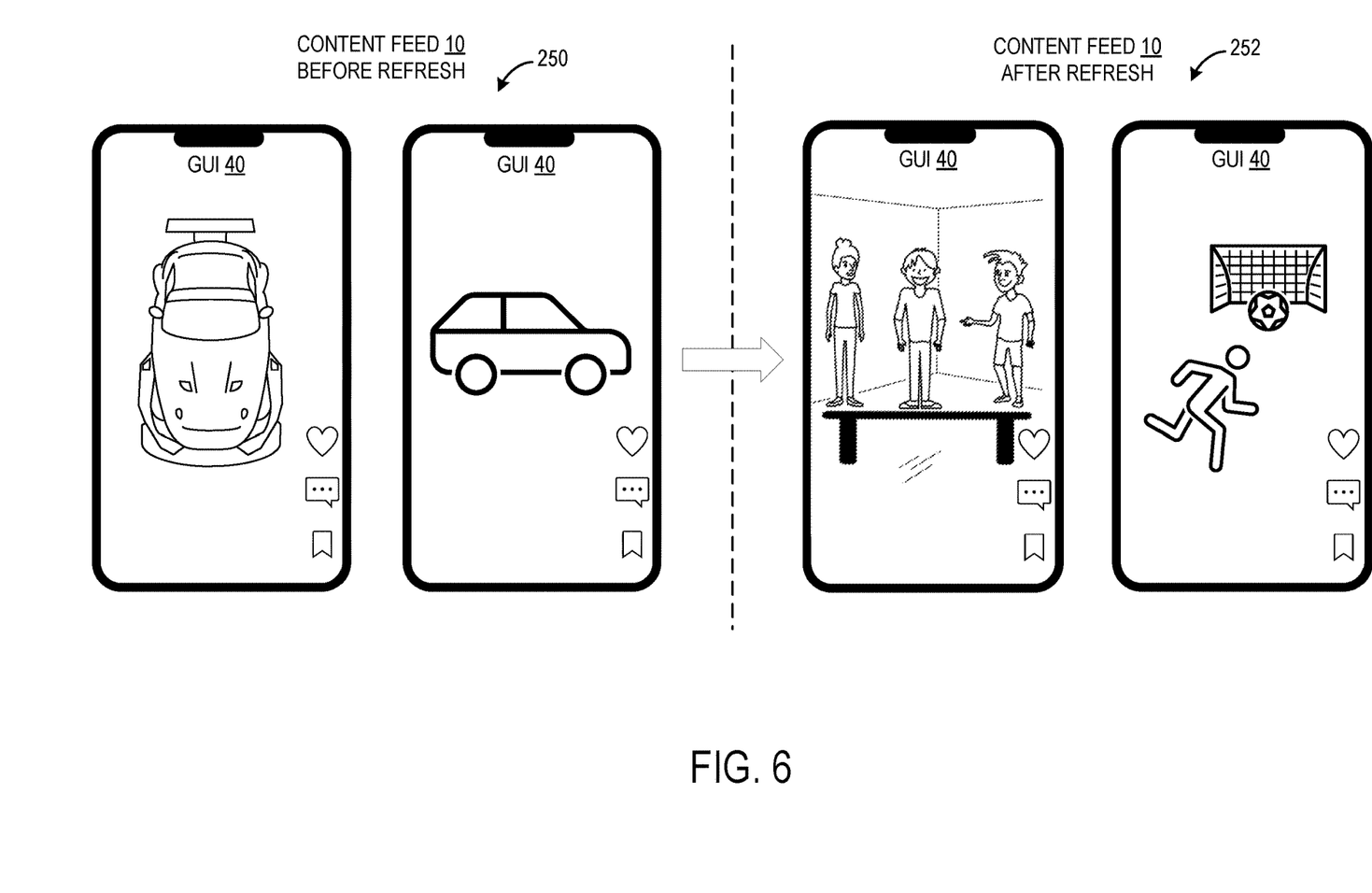
FIG. 6 shows an example GUI of the system according to FIG. 1 displaying a content feed on a user computing device before and after recommendation engine refresh.

After the recommendation engine refresh is made, the processor 4 is configured to generate, via the recommendation engine 8, post-refresh content items 12 based on the masked or reset user content interaction information 24 and user information 20 as well as based on the device information 28 of the user, search history 32, and recommendation history 34 that has not been masked or reset, and transmit the post-refresh content items 12 to the user computing device 38 for display in the content feed 10. FIG. 6 shows an example GUI of the system 2 according to FIG. 1 displaying the content feed 10 on the user computing device 38 before and after a recommendation engine refresh. The depicted example 250 shows the GUI 40 before the recommendation engine refresh, in which the recommendation engine 8 contains the content items 12 that are selected for the user by the present invention. In the depicted situation, the content feed 10 before the refresh contains content items 12 that feature a car, per the recommendation engine's selection. In contrast, the depicted example 252 shows the GUI 40 after the recommendation engine refresh, in which the content feed 10 contains the content items 12 that would be selected for a new user. In the depicted situation, after the content refresh, the content feed 10 contains the content items 12 that are liked by a wide demographic of users of the social media platform 16 instead the content items 12 that feature a car. As the user continues to use the social media platform 16 according to FIG. 1, the computing system 2 repeats the process of gathering new data, determining the user's new preferences, and selecting appropriate content items 12 to include on the user's content feed 10, such that the feed accurately reflects the user's most recent taste.

In one configuration of the computing system 2, it will be appreciated that the processor 4 may be configured to mask or reset a portion of the user and content data 18 such as the user information 20 and user content interaction information 24 and provide the masked information to other services 60 such as advertisements provided by the social media platform 16 such that the user would be able to refresh advertisement contents in the same manner as the content feed 10 as discussed above.

Figure 7:
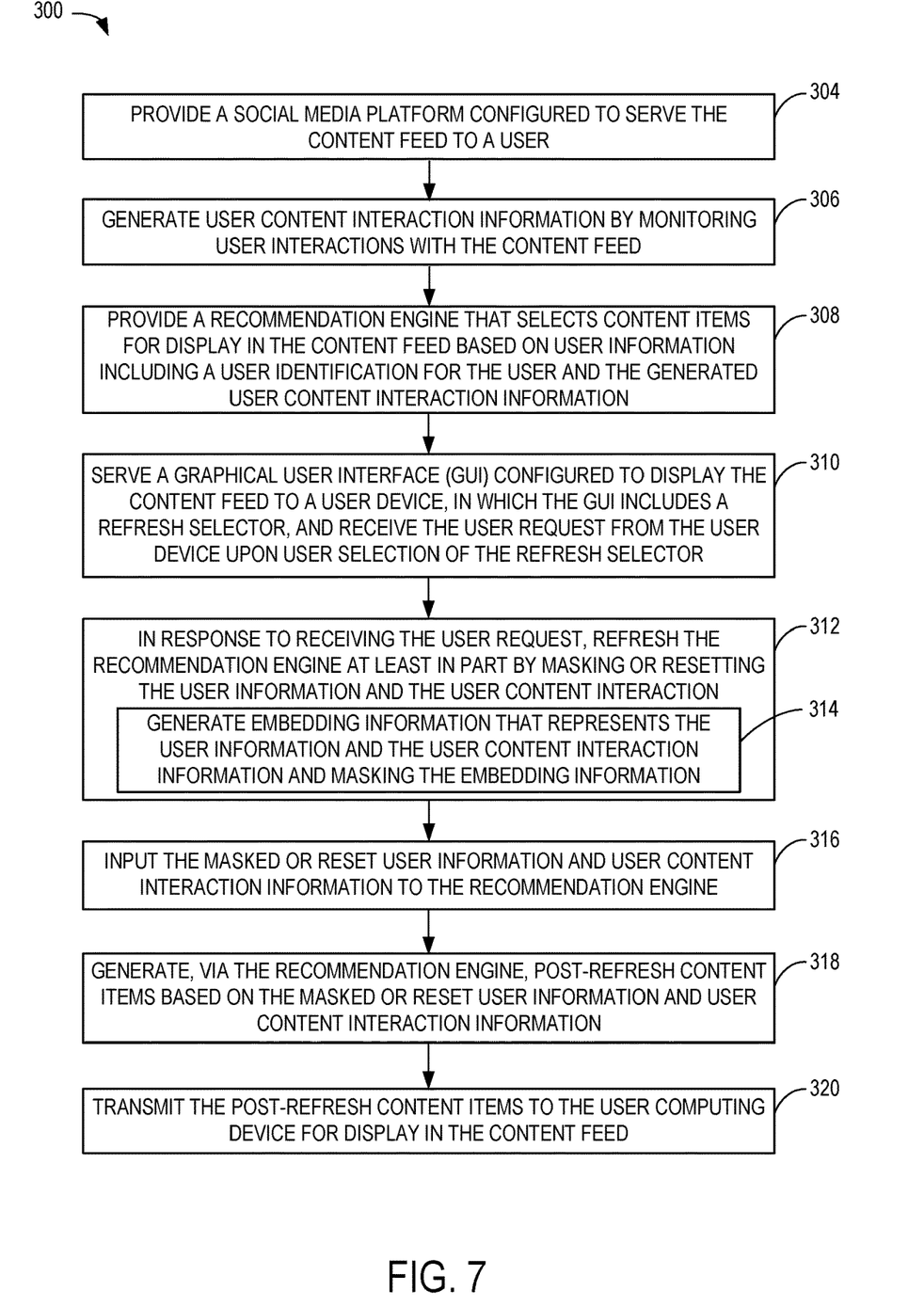
FIG. 7 shows a flowchart of a computerized method for refreshing a recommendation engine according to one example implementation of the present disclosure.

FIG. 7 shows a flowchart of a computerized method 300 for refreshing a recommendation engine according to one example implementation of the present disclosure. Method 300 may be implemented by the hardware and software of computing system 2 described above, or by other suitable hardware and software. At step 304, the method 300 may include providing a social media platform configured to serve the content feed to a user computing device of a user.

At step 306, the method may further include generating user content interaction information by detecting user interactions with the content feed. At step 308, the method may further include providing a recommendation engine that selects content items for display in the content feed based on user information including a user identification for the user and the generated user content interaction information. In addition, content information, device information, and other information may be input to the recommendation engine.

At step 310, the method may further include serving a graphical user interface (GUI) configured to display the content feed to a user device, in which the GUI includes a refresh selector, the refresh request from the user device upon user selection of the refresh selector.

At step 312, the method may further include, in response to receiving the refresh request, refreshing the recommendation engine at least in part by masking or resetting the user content interaction information. As indicated at step 314, the user information and user content interaction information may be masked by generating embedding information that represents the user information and the user content interaction information and masking the embedding information.

At step 316, the method may further include inputting the masked or reset user information and user content interaction information to the recommendation engine. At step 318, the method may further include generating, via the recommendation engine, post-refresh content items based on the masked or reset user information and user content interaction information. At step 320, the method may further include transmitting the post-refresh content items to the user computing device for display in the content feed.

The above described systems and methods may be implemented to reset a user's content feed on a social media platform without necessitating recreation of a new user account or deletion of data reflecting the user's engagement with content on the platform. The systems and methods discussed above can produce an impactful change in the content feed that is quickly perceived by the user, without causing an interruption to the user's continued use of the platform.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
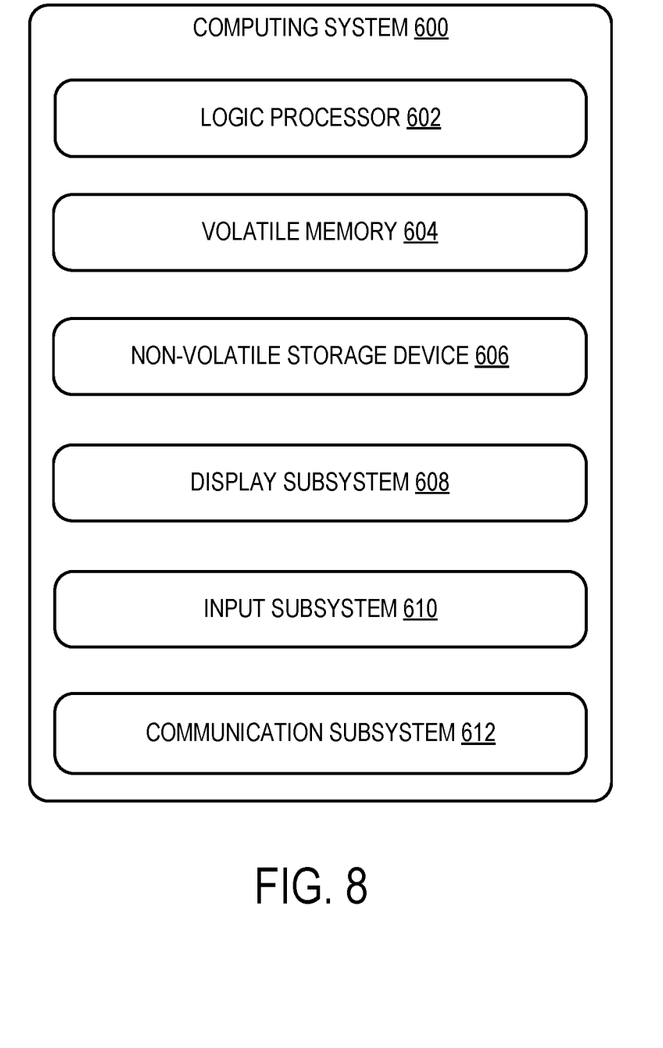
FIG. 8 shows an example computing environment according to which the embodiments of the present disclosure may be implemented.

FIG. 8 schematically shows a non-limiting embodiment of a computing system 600 that can enact one or more of the methods and processes described above. Computing system 600 is shown in simplified form. Computing system 600 may embody the computing system 2 described above and illustrated in FIG. 1. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display sub system 608, input sub system 610, communication sub system 612, and/or other components not shown in FIG. 1.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. One aspect provides a computing system. The computing system may include one or more processors configured to execute instructions stored in memory to provide a social media platform configured to serve a content feed to a user computing device of a user. The processors may be further configured to generate user content interaction information by detecting user interactions with the content feed and provide a recommendation engine that selects content items for display in the content feed based on the generated user content interaction information. The processors may be further configured to receive a refresh request to refresh the recommendation engine, and in response to receiving the refresh request, refresh the recommendation engine at least in part by masking or resetting the user content interaction information. The processors may be further configured to input the masked or reset user content interaction information to the recommendation engine, generate, via the recommendation engine, post-refresh content items based on the masked or reset user content interaction information, and transmit the post-refresh content items to the user computing device for display in the content feed. The processors may be further configured to serve a graphical user interface (GUI) configured to display the content feed to the user computing device, the GUI including a refresh selector, and receive the refresh request from the user computing device upon user selection of the refresh selector.

According to this aspect, the recommendation engine may select the content items for display based on the generated user content interaction information and user information, wherein the user information includes at least a user identification for the user. The recommendation engine may further select the content items for display based on the generated user content interaction information, the user information, and device information of the user.

According to this aspect, the processors may be further configured to, in response to receiving the refresh request, refresh the recommendation engine at least in part by additionally masking or resetting the user information including the user identification.

According to this aspect, the refresh of the recommendation engine may include a first temporary refresh that masks or resets the user content interaction information and the user information including the user identification until a first predetermined threshold number of views is reached. The refresh of the recommendation engine may further include a second temporary refresh that unmasks the user content interaction information and the user information except for the user identification and masks the user identification after the first predetermined threshold number of views has occurred and until a second predetermined threshold number of views is reached.

According to this aspect, the processors may be further configured to end the second temporary refresh by unmasking the user identification after the second predetermined threshold number of views is reached.

According to this aspect, the processors may be further configured to generate embedding information based on the user content interaction information, and refresh the recommendation engine by masking or resetting the user content interaction information by masking or resetting embedding information representing the user content interaction information.

According to this aspect, the processors may be further configured to receive a request from a user to undo the recommendation engine refresh, and undo the recommendation engine refresh in response to receiving the request.

According to another aspect of the present disclosure, a computerized method is provided. The computerized method may include providing a social media platform configured to serve the content feed to a user computing device of a user. The computerized method may further include generating user content interaction information by detecting user interactions with the content feed. The computerized method may further include providing a recommendation engine that selects content items for display in the content feed based on the generated user content interaction information. The computerized method may further include receiving a refresh request to refresh the recommendation engine, and in response to receiving the refresh request, refreshing the recommendation engine at least in part by masking or resetting the user content interaction information. The computerized method may further include inputting the masked or reset user content interaction information to the recommendation engine. The computerized method may further include generating, via the recommendation engine, post-refresh content items based on the masked or reset user content interaction information, and transmitting the post-refresh content items to the user computing device for display in the content feed. The computerized method may further include serving a graphical user interface (GUI) configured to display the content feed to a user computing device, the GUI including a refresh selector, and receiving the refresh request from the user computing device upon user selection of the refresh selector. The computerized method may further include selecting, via the recommendation engine, the content items for display based on the generated user content interaction information and user information, wherein the user information includes at least a user identification for the user. The computerized method may further include, in response to receiving the refresh request, refreshing the recommendation engine at least in part by additionally masking or resetting the user information including the user identification. The computerized method may further include generating embedding information based on the user content interaction information, and refreshing the recommendation engine by masking or resetting the user content interaction information by masking or resetting embedding information representing the user content interaction information.

According to this aspect, the refresh of the recommendation engine may include a first temporary refresh that masks or resets the user content interaction information and the user information including the user identification for a first predetermined threshold number of views. The refresh of the recommendation engine may further include a second temporary refresh that unmasks the user content interaction information and the user information except for the user identification and masks the user identification for a second predetermined threshold number of views.

According to another aspect of the present disclosure, a computer readable medium is provided. The computer readable medium may include instructions, when executed by one or more processors, causing the one or more processors to execute steps of providing a social media platform configured to serve a content feed to a user computing device of a user and generating user content interaction information by detecting user interactions with the content feed. The steps may further include providing a recommendation engine that selects content items for display in the content feed based on the generated user content interaction information, user information including at least a user identification, and device information of the user. The steps may further include receiving a refresh request to refresh the recommendation engine, and in response to receiving the refresh request, refresh the recommendation engine at least in part by masking or resetting the user content interaction information and the user information. The steps may further include inputting the masked or reset user content interaction information, the masked or reset user information, and the device information of the user to the recommendation engine, and generating, via the recommendation engine, post-refresh recommendation content items based on the masked or reset user content interaction information and the masked or reset user information. The steps may further include transmitting the post-refresh content items to the user computing device for display in the content feed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
one or more processors configured to execute instructions stored in memory to:
provide a social media platform configured to serve a content feed to a user computing device of a user;
generate user content interaction information by detecting user interactions with the content feed;
provide a recommendation engine that selects content items for display in the content feed based on the generated user content interaction information and user information including at least a user identification for the user;
receive a refresh request to refresh the recommendation engine;
in response to receiving the refresh request, refresh the recommendation engine at least in part by masking or resetting the user content interaction information and the user information including the user identification; and
after masking or resetting, unmask at least part of the user content interaction information and the user information based on a number of views of post-refresh content items by the user.

2. The computing system of claim 1, wherein the one or more processors are further configured to:
input the masked or reset user content interaction information to the recommendation engine;
generate, via the recommendation engine, the post-refresh content items based on the masked or reset user content interaction information; and
transmit the post-refresh content items to the user computing device for display in the content feed.

3. The computing system of claim 1, wherein the one or more processors are further configured to:
serve a graphical user interface (GUI) configured to display the content feed to the user computing device, the GUI including a refresh selector; and
receive the refresh request from the user computing device upon user selection of the refresh selector.

4. The computing system of claim 1, wherein
the recommendation engine selects the content items for display based on the generated user content interaction information, the user information, and device information of the user.

5. The computing system of claim 1, wherein the refresh of the recommendation engine includes a first temporary refresh that masks or resets the user content interaction information and the user information including the user identification until a first predetermined threshold number of views is reached.

6. The computing system of claim 5, wherein the refresh of the recommendation engine includes a second temporary refresh that unmasks the user content interaction information and the user information except for the user identification and masks the user identification after the first predetermined threshold number of views has occurred and until a second predetermined threshold number of views is reached.

7. The computing system of claim 6, wherein one or more processors are further configured to end the second temporary refresh by unmasking the user identification after the second predetermined threshold number of views is reached.

8. The computing system of claim 1, wherein the one or more processors are further configured to:
generate embedding information based on the user content interaction information; and
refresh the recommendation engine by masking or resetting the user content interaction information by masking or resetting embedding information representing the user content interaction information.

9. The computing system of claim 1, wherein the one or more processors are further configured to:
receive a request from a user to undo the recommendation engine refresh; and
undo the recommendation engine refresh in response to receiving the request.

10. A computerized method for refreshing a recommendation engine, the method comprising:
providing a social media platform configured to serve the content feed to a user computing device of a user;
generating user content interaction information by detecting user interactions with the content feed;
providing a recommendation engine that selects content items for display in the content feed based on the generated user content interaction information and user information including at least a user identification for the user;
receiving a refresh request to refresh the recommendation engine;
in response to receiving the refresh request, refreshing the recommendation engine at least in part by masking or resetting the user content interaction information and the user information including the user identification; and
after masking or resetting, unmask at least part of the user content interaction information and the user information based on a number of views of post-refresh content items by the user.

11. The computerized method of claim 10, further comprising:
inputting the masked or reset user content interaction information to the recommendation engine;
generating, via the recommendation engine, the post-refresh content items based on the masked or reset user content interaction information; and
transmitting the post-refresh content items to the user computing device for display in the content feed.

12. The computerized method of claim 10, further comprising:
serving a graphical user interface (GUI) configured to display the content feed to a user computing device, the GUI including a refresh selector; and
receiving the refresh request from the user computing device upon user selection of the refresh selector.

13. The computerized method of claim 10, wherein the refresh of the recommendation engine includes a first temporary refresh that masks or resets the user content interaction information and the user information including the user identification for a first predetermined threshold number of views.

14. The computerized method of claim 13, wherein the refresh of the recommendation engine includes a second temporary refresh that unmasks the user content interaction information and the user information except for the user identification and masks the user identification for a second predetermined threshold number of views.

15. The computerized method of claim 10, further comprising:
generating embedding information based on the user content interaction information; and
refreshing the recommendation engine by masking or resetting the user content interaction information by masking or resetting embedding information representing the user content interaction information.

16. A non-transitory computer readable medium including instructions stored thereon, the instructions, when executed by one or more processors, causing the one or more processors to execute steps of:

providing a social media platform configured to serve a content feed to a user computing device of a user;

generating user content interaction information by detecting user interactions with the content feed;

providing a recommendation engine that selects content items for display in the content feed based on the generated user content interaction information, user information including at least a user identification, and device information of the user;

receiving a refresh request to refresh the recommendation engine;

in response to receiving the refresh request, refresh the recommendation engine at least in part by masking or resetting the user content interaction information and the user information including the user identification;

inputting the masked or reset user content interaction information, the masked or reset user information, and the device information of the user to the recommendation engine;

generating, via the recommendation engine, post-refresh recommendation content items based on the masked or reset user content interaction information and the masked or reset user information;

transmitting the post-refresh recommendation content items to the user computing device for display in the content feed; and after masking or resetting, unmasking at least part of the user content interaction information and the user information based on a number of views of the post-refresh recommendation content items by the user.

* * * * *